United States Patent [19]
Gloger

[11] Patent Number: 5,676,246
[45] Date of Patent: Oct. 14, 1997

[54] CONTAINER

[76] Inventor: Klaus Willy Gloger, 6 Hillcrest Street, Bayview Heights, Cairns, Queensland, 4868, Australia

[21] Appl. No.: 721,940

[22] Filed: Sep. 27, 1996

Related U.S. Application Data

[63] Continuation of Ser. No. 284,692, filed as PCT/AU93/00053, Feb. 11, 1993, abandoned.

[30] Foreign Application Priority Data

Feb. 12, 1992 [AU] Australia .............. PL0854/92

[51] Int. Cl.$^6$ .................................... B65D 85/57
[52] U.S. Cl. .............. 206/308.1; 206/309; 206/312; 312/9.26; 312/9.16
[58] Field of Search ............... 206/308.1, 308.3, 206/309, 310, 312, 313; 312/9.11, 9.16, 9.22, 9.24, 9.26

[56] References Cited

U.S. PATENT DOCUMENTS

| | | | |
|---|---|---|---|
| 3,969,007 | 7/1976 | Lowry | 312/15 |
| 4,640,415 | 2/1987 | Ackeret | 206/387 |
| 4,664,454 | 5/1987 | Schatteman et al. | 312/206 |
| 4,699,268 | 10/1987 | Oishi | 206/313 |
| 4,702,533 | 10/1987 | Seifert | 312/12 |
| 4,763,962 | 8/1988 | Ackeret | 312/16 |
| 4,863,031 | 9/1989 | Tanaka et al. | 206/444 |
| 5,096,064 | 3/1992 | Rufo, Sr. et al. | 206/308.1 |
| 5,265,721 | 11/1993 | Castritis | 206/308.1 |
| 5,346,295 | 9/1994 | Richter | 312/9.12 |
| 5,425,450 | 6/1995 | Lin | 206/310 |

FOREIGN PATENT DOCUMENTS

| | | | |
|---|---|---|---|
| 32279/84 | 3/1985 | Australia . | |
| 42404/85 | 11/1985 | Australia . | |
| 0 181 835 | 5/1986 | European Pat. Off. . | |
| 0 355 011 | 2/1990 | European Pat. Off. . | |
| 0 358 780 | 3/1990 | European Pat. Off. . | |
| 2 644 439 | 9/1990 | France . | |
| 23 07 410 | 8/1974 | Germany . | |
| 30 08 513 | 9/1981 | Germany . | |
| 63-263680 | 10/1988 | Japan | 206/308.1 |
| 63-271780 | 11/1988 | Japan | 206/308.1 |

*Primary Examiner*—David T. Fidei
*Attorney, Agent, or Firm*—Thomas J. Engellenner; Anthony A. Laurentano; Lahive & Cockfield, LLP

[57] ABSTRACT

A container (100) having a recess (107) arranged to receive an object such as a compact disc (50). The recess (107) has a mouth (112) opening through a side wall (108) of the container (100) and an ejector (118) for ejecting the object from the recess (107).

9 Claims, 5 Drawing Sheets

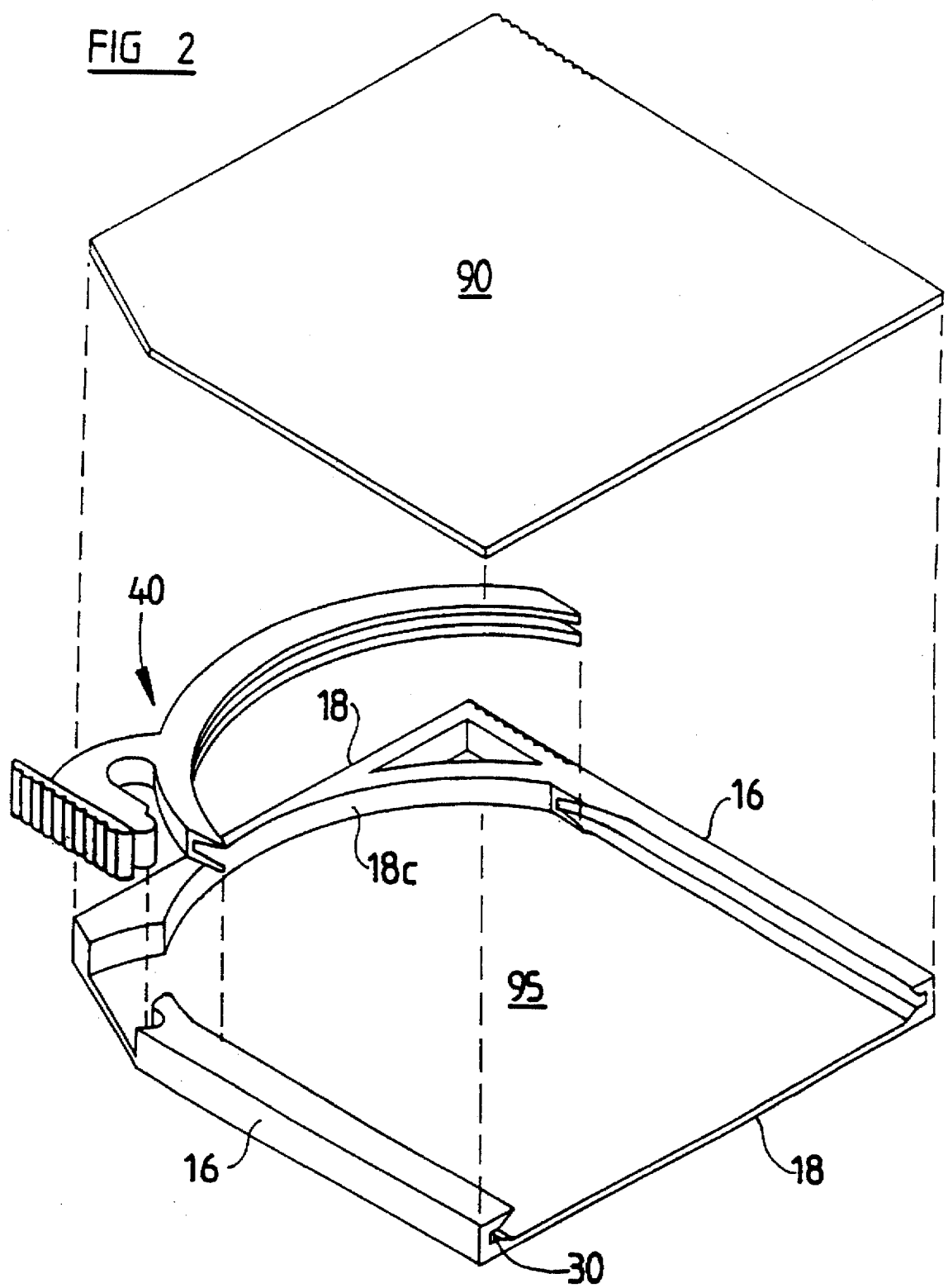

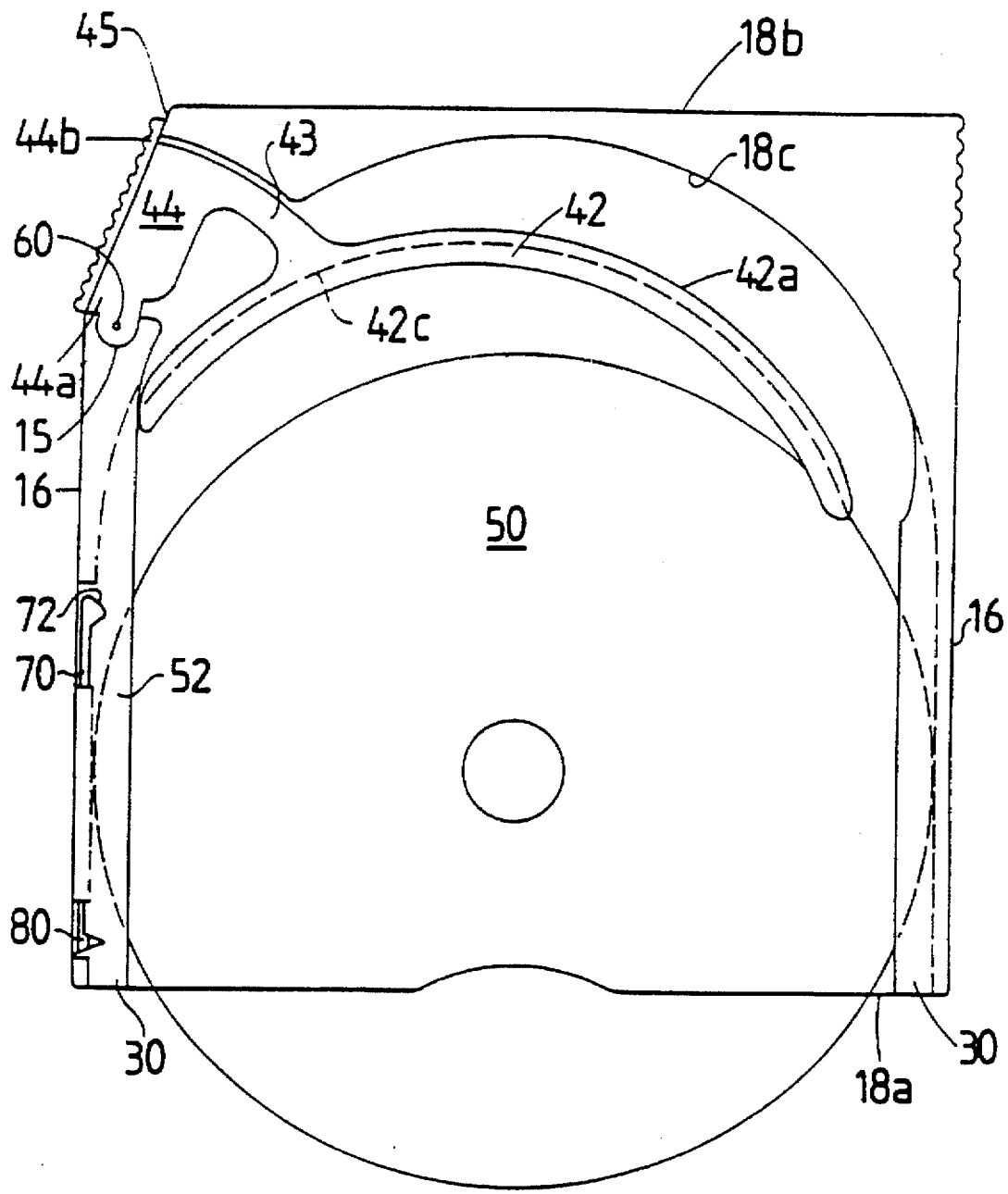
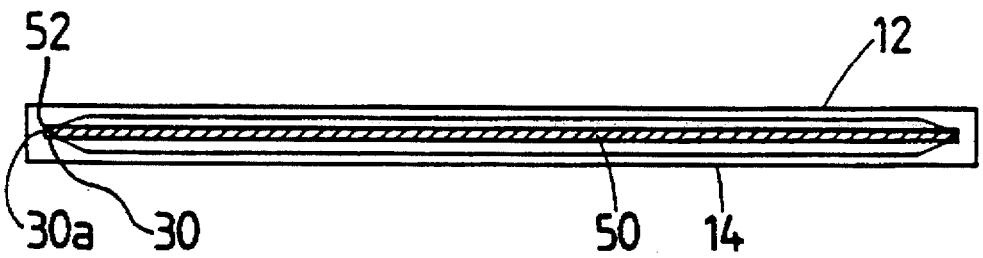

CONTAINER

This application is a continuation of application Ser. No. 08/284,692, filed as PCT/AU93/00053, Feb. 11, 1993, and entitled: A CONTAINER, now abandoned.

BACKGROUND OF THE INVENTION

The present invention relates to a container, and in particular to a container for storing compact discs.

Containers currently being used to store compact discs can be difficult to open. Young children with small hands find it particularly difficult to apply the necessary force to open these types of containers. The present invention seeks to provide a container which can both safely store objects such as compact discs and which can easily be opened.

SUMMARY OF THE INVENTION

According to a first aspect of the present invention there is prodded a container having a recess arranged to receive an object, said recess having a mouth opening through a side wall of the container, and ejector means for ejecting said object from said recess, Preferably, said ejector means is arranged to contact a peripheral edge of the object so as to eject the object out of the container.

Preferably, track means is provided in opposed side walls of th e container. The track means being arranged so as to receive the peripheral edge of an object such as compact disc when it is received in the container.

Preferably, said ejector means is arranged to slide said object contained within the recess, towards the side wall to a position at which at least a portion of the object extends out of the recess.

Preferably, the ejector means comprises an arm member pivotally mounted in said container. The arm member being movable between a first position in which a portion of the arm member is positioned substantially adjacent a portion of the container, and a second position in which the portion of the arm member is displaced from said portion of the container.

Preferably, the ejector means also comprises a trigger means which extends through an aperture in the container. The trigger means being movable between a first and a second position, said movement of the trigger means from the first to the second position resulting in movement of the arm member from the first position to the second position.

Preferably, the container is made of a plastics material and is of a rectangular configuration.

Preferably, blocking means is provided at the mouth of the recess prevent dirt and other unwanted matter entering the recess. The blocking means may comprise a set of fine bristles, a strip of material such as felt or a flap hingedly mounted to the mouth of the aperture.

Preferably, means is provided to retain the object in the container when the arm member is in the first position.

BRIEF DESCRIPTION OF THE DRAWINGS

An embodiment of the invention will now be described by way of example only with reference to the accompanying drawings in which:

FIG. 2 is an assembly view of the container shown in FIG. 1;

FIG. 3 is a top view of the container shown in FIG. 1 illustrating a compact disc being ejected from the container;

FIG. 4 is an end view of the container shown in FIG. 3.

DESCRIPTION OF ILLUSTRATED EMBODIMENTS

Figure 1:
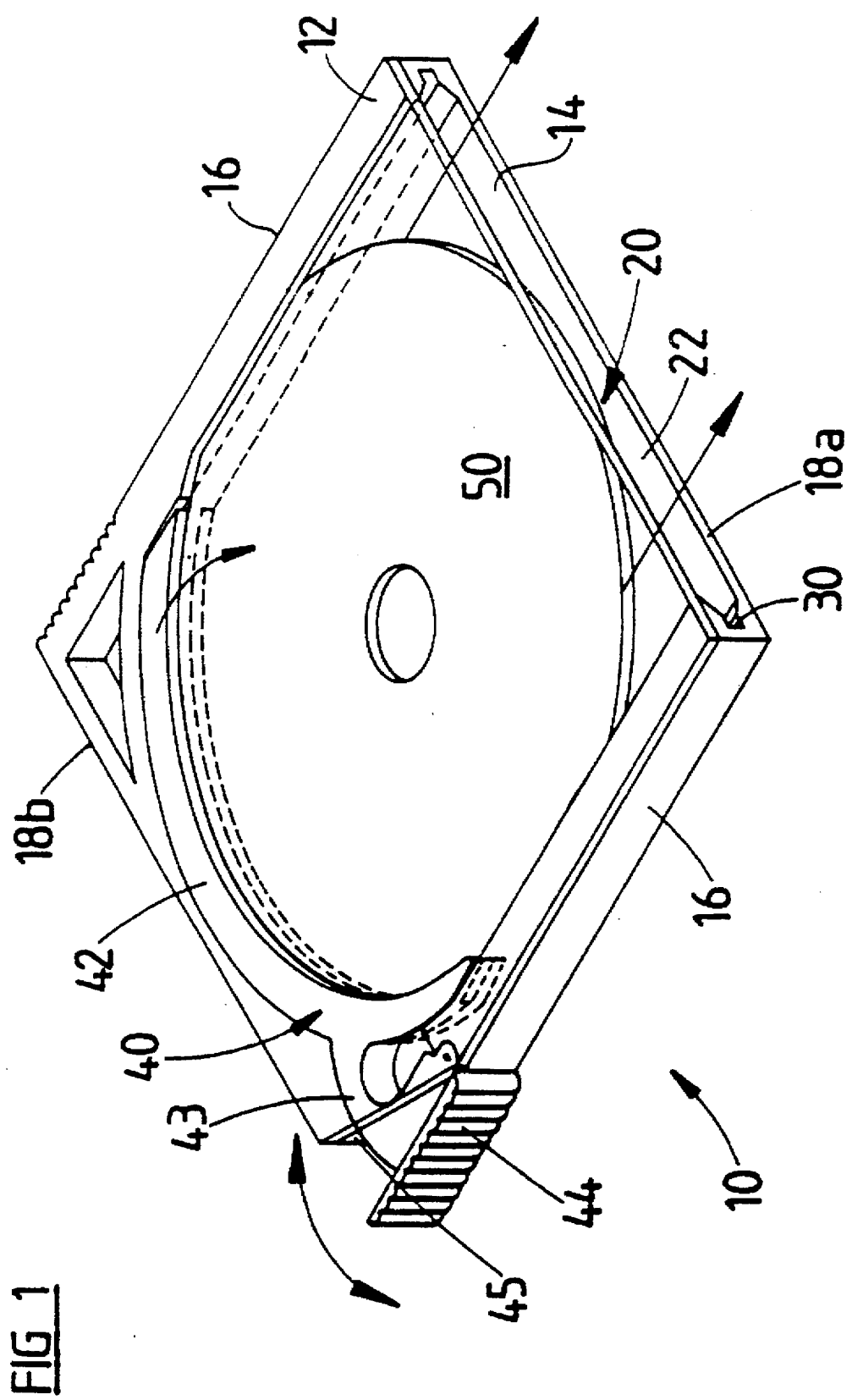
FIG. 1 is a perspective view of a container according to a first embodiment of the invention showing a compact disc stored within the container.

FIG. 1 illustrates a square container 10 which is made of a clear plastics material. The container 10 has top and bottom walls 12, 14 and first and second pairs of opposed side walls 16, 18. The container 10 is formed with a recess 20 having a mouth 22 which opens through side wall 18a. Recess 20 is arranged to receive an object such as a compact disc 50.

A track 30 extends along each of the side walls 16 of the container 10. The longitudinal mouth of each track 30 opens into the recess 20. Each track 30 is arranged to receive a portion of the peripheral edge 52 of the compact disc 50 when it is received in the container 10. In this way, the area of the side faces of the compact disc 50 which must be preserved in order to ensure sound quality is prevented from coming into contact with either of the top and bottom wall 12, 14 of the container 10. The engagement of the peripheral edge 52 of the compact disc 50 in the tracks 30 is best illustrated in FIG. 4.

An ejector 40 comprising an arm member 42, a web 43 and a trigger 44 is mounted in the container 10. Web 43 joins the arm member 42 to the trigger 44. Arm member 42 comprises a substantially C-shaped rib which is shaped along one face 42a to be complementary with the inside wall surface 18c of the side wall 18b, and on the other opposite face 42b includes a track 42c, which is shaped so as to be complementary with the periphery of the compact disc 50. The ejector 40 is fitted to the container 10 such that the trigger 44 extends through an aperture 45 in one of the side walls 16 of the container 10. Aperture 45 extends diagonally across one of the corners of the container 10. Trigger 44 is preferably sized and shaped so that it is substantially contained within an area bounded by imaginary extensions of the side walls 16, 18. The ejector 40 is preferably made of a moulded plastics material.

The ejector 40 is pivotally mounted to the container 10 by the interconnection between the innermost end 44a of the trigger 44 and a complementary shaped portion 15 of the side wall 16 (FIG. 4). This interconnection enables the ejector 40 to be moveable between a first position, in which the arm member 42 is positioned substantially adjacent to the inside wall surface 18c of side wall 18b, and a second position in which the arm member 42 is displaced from said inside wall surface 18c of the side wall 18b of the container 10. The second position of the arm member 42 is illustrated in FIG. 3. Ejector 40 pivots about pivot point 60 as it moves from the first position to the second position.

Movement of the arm member 42 from the first position to the second position is facilitated by pushing the outermost end 44b of the trigger 44 towards the side wall 16 of the container 10. Such movement of the trigger 44 causes the arm member 42 to move from the first position, as illustrated in FIG. 1, to the second position, as illustrated in FIG. 3. As the arm member 42 moves from the first position to the second position the compact disc 50 is pushed along the tracks 30 in each of the side walls 16 of the container 10. When the arm member 42 is in the second position, as illustrated in FIG. 3, the compact disc 50 is positioned so that a substantial portion of the compact disc 50 extends through the mouth 22 of the recess 20 of the container 10.

A flexible resilient tongue 70 is formed in one of the side walls 16 of the container 10. The free end 72 of the tongue 70 is arranged to protrude through the bottom wall 30a of the track 30. Thus, when the compact disc 50 is held in the container 10 and the arm member 42 is in the first position, the free end 72 of the tongue 70 engages against the periphery of the compact disc 50. This engagement between the free end 72 of the tongue 70 and the disc 50 is sufficient to prevent the disc 50 from inadvertently falling out of the container 10.

When the arm member 42 is moved, by actuation of the trigger 42, from the first position to the second position, the periphery of the compact disc 50 is forced against the free end 72 of the tongue 70. The tongue 70 is thereby caused to deflect outwardly away from the bottom wall 30a of the track 30 so as to enable the disc 50 to pass by it and travel along the track 30 towards the mouth 22 of the container 10.

A second flexible resilient tongue 80 is formed in one of the side walls 16 substantially adjacent side wall 18 a. Second tongue 80 is smaller than tongue 70 but is preferably of similar construction. The second tongue 80 is arranged to prevent the compact disc 50 from exiting the container too quickly whet, the trigger 44 is activated with great force.

To prevent dirt and dust from entering the recess of the container 10 the mouth 22 of the recess 20 may be fitted with a set of fine soft bristles or a strip of felt type material to prevent entry of dust etc. into the recess 20. Alternatively, a flap may be hingedly mounted across the mouth 22 of the recess 20 to prevent entrance of dust etc. The flap would be arranged to open upon contact of the compact disc 50 on the inside face of the flap when the arm member 42 is moved from the first to the second position.

The container 10 would preferably comprise two moulded parts. The lower part 95 comprising side walls 16, 18, bottom wall 24 and tongues 70, 80 and the upper part 90 comprising the top wall 12. As shown in FIG. 2, the container 10 and ejector 40 may be assembled by fitting the ejector 40 into the lower pan 95 so that the innermost end 44a of the trigger 44 is engaged with the complementary shaped portion 15 of the side wall 16, and then attaching the upper part 90 to the lower part 100. The upper part 90 may be attached to the lower part 95 by gluing, ultrasonic welding etc.

The embodiment described is particularly advantageous because the compact disc 50 can be quickly and easily removed from the container. The compact disc 50 is replaced into the container by inserting the compact disc 50 such that the peripheral edge 52 of the disc 50 is engaged in the tracks 30. A gentle force is then applied to the compact disc 50 to push the disc 50 inwardly along the tracks 30 and past the first and second tongues 70, 80. The first and second tongues 70, 80 are arranged so that they deflect outwardly away from the track 30 when the edge of the compact disc 50 is forced against them. As the disc 50 is pushed into the container 10 along tracks 30 the disc 50 contacts the arm member 42 to move it from the second position to the first position. The container 10 is easily manufactured and assembled.

Figure 5:
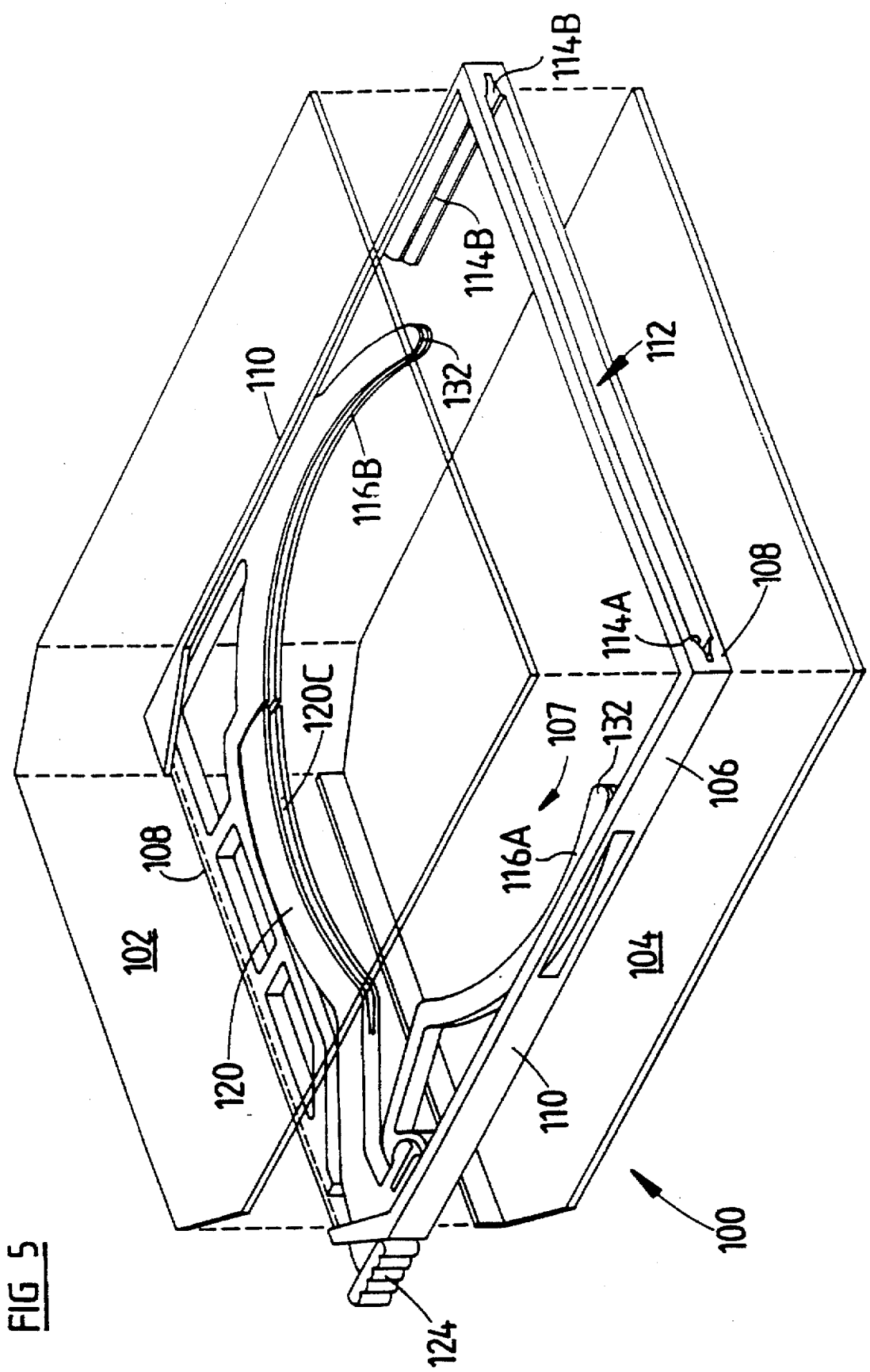
FIG. 5 is an assembly view of a container according to a second embodiment of the invention.
Figure 6:
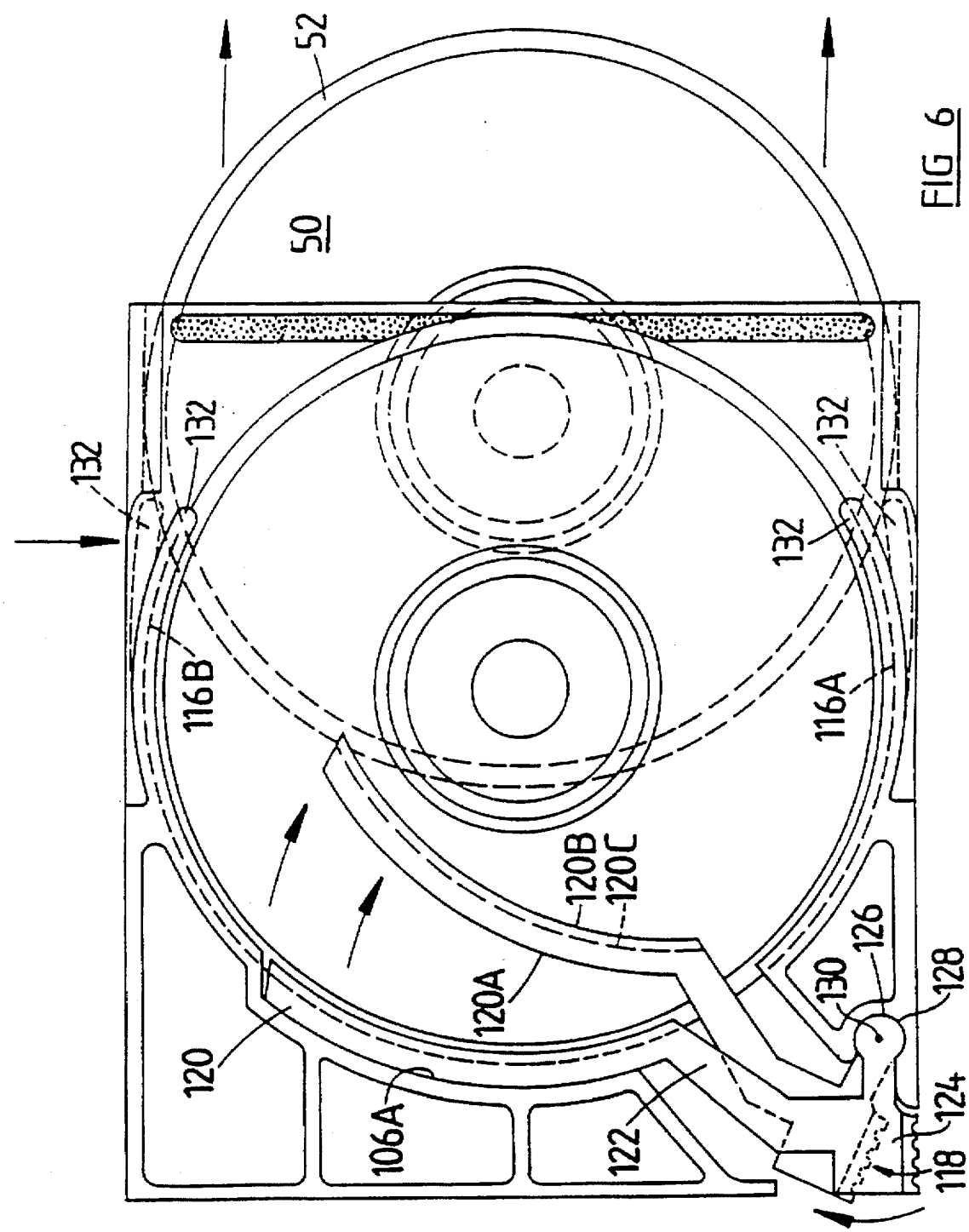
FIG. 6 is a top view of the container shown in FIG. 5 illustrating a compact disc being ejected from the container.

FIGS. 5 and 6 depict a container 100 in accordance with a second embodiment of the invention. The container 100 is similar to the container shown in FIGS. 1 to 4 but, as best shown in FIG. 5, comprises a three piece construction rather than a two piece construction.

The container 100 shown in FIGS. 5 and 6 comprises a top cover 102, a bottom cover 104 and a core frame 106 disposed therebetween. A space 107 for receiving a compact disc is defined by the top and bottom covers 102, 104 and the core frame 106. The top and bottom covers 102, 104 are each made from a rectangular sheet of a plastics material which are bonded to the intermediate core frame 106. The core frame 106 has first and second pairs of opposed side walls 108, 110. In one of the side walls 108 there is an opening 112 arranged to enable a compact disc 50 to pass therethrough so that it can be contained in the space 107. A track section 114A, 114B extends from the opening 112 and along a portion of each of the side walls 110 of the container 100.

As best shown in FIG. 6, the core frame 106 includes two curved track sections 116A, 116B formed substantially adjacent the side walls 110. The straight track sections 114A, 114B and the curved track sections 116A, 116B are all arranged so as to receive a portion of peripheral edge 52 of the compact disc 50 when it is received in the container 100.

An ejector 118 comprising an arm member 120, a web member 122 and a trigger member 124 is pivotally mounted in the container 100. The ejector 118 may be fitted to the container 100 either during assembly of the top and bottom covers 102, 104 and the core frame 106 or once the container 100 has been completely assembled. The ejector 118 is preferably made of polypropylene and is thinner than the thickness of the core frame 106. This ensures that the ejector 118 can move back and forth as shown by dotted lines in FIG. 6 without the ejector 118 coming into contact with either the top or bottom covers 102, 104. The arm member 120 of the ejector comprises a substantially C-shaped rib which is shaped along one face 120A so as to be complementary with the inside surface 106A of the core frame 106. Along the other face 120B the arm member 120 has a track 120C which is shaped to receive the periphery 52 of a compact disc 50.

The ejector 118 is substantially similar to the ejector 40 described in relation to the first embodiment of the invention. The only substantial difference is the manner of interconnection of the ejector 118 to the: core frame 106. The ejector 118 is pivotally connected to the core frame 106 by means of a circular member 126 which is received in a socket 128 in the core frame 106. The interconnection of the ejector 118 to the container 100 is such that the ejector 118 pivots about pivot point 130 when the triter 124 is pushed inwardly.

A compact disc 50 is inserted into the container 100 by passing the disc 50 through the opening 112 in the side wall 108. As best shown in FIG. 6, as the compact disc 50 is inserted the peripheral edges 52 of the disc 50 enter the straight tracks sections 114A, 114B on the side walls 106. As the compact disc is pushed further into the container 100, portions of the peripheral edge 52 of the disc 50 engage with each of the first ends 132 of the curved track sections 116A, 116B. The curved track sections 116A, 116B are constructed in such a manner that the first ends 132 can flex outwardly towards their adjacent side walls 106. This movement of the first ends 132 of the curved track sections 116A, 116B is depicted by the dotted outline in FIG. 6. The first ends 132 of the curved track sections 116A. 116B are preferably arranged such that they cause the disc 50 to be pulled or sucked into the container 100 until a portion of the peripheral edge 52 of the disc 50 enters the track 120C in the arm member 120. At this point the first ends 132 of the curved track sections 116A, 116B flex inwardly to their original positions.

To eject the compact disc 50 from the container 100, the trigger 124 of the ejector 118 is pushed inwardly which causes the arm member 120 to push the compact disc 50 out of the container. The pressure applied to the disc 50 by the arm member 120 is sufficient to cause the first ends 132 of the curved track sections 116A, 116B to move outwardly towards the side walls 106. This movement preferably causes the peripheral edge 52 of the disc 50 to move along the straight track sections 114A, 114B and out of the container 100.

The straight track sections 114A, 114B, the curved track sections 116A, 116B and the track 120C in the arm member 120 are arranged such that when a compact disc 50 moves in or out of the container 100 and when the disc 50 is stored in the container the screen printed faces of the disc do not come into contact with the top or bottom The free end portions 132 of the curved track sections 116A, 116B ensure that a compact disc 50 contained within the container 100 is not inadvertently released from the container. The free end portions 132 act in a similar manner to the tongue 70 described in relation to the first embodiment of the invention.

Positioned across the width of the inner side of the top and bottom covers 102, 104 and adjacent the opening 112 is a thin strip of soft material which is arranged to clean the top and bottom faces of the disc 50 as it is inserted into and out of the container 100. The opening 112 may be provided with a flap or bristles to prevent dust or dirt from entering the space 107.

The embodiments have been described by way of example only and modifications are possible within the scope of the invention.

I claim:

1. A hand held disc storage container comprising:

a flat generally rectangular and horizontally extending box defining a disc-containing cavity adapted to receive the disc, said cavity having opposed sides, a rear, a front, and opposed upper and lower walls, said box having a slot formed along one edge which communicates with the front of the cavity and through which the disc can be horizontally inserted into and removed from the box in edgewise fashion;

manually operable disc ejector means mounted to engage an edge portion of the disc to displace the disc at least partially from the cavity through the slot, said disc ejector means including a portion extending into the cavity for engaging the disc and a portion extending externally of the box and adapted for manual actuation by an operator, said disc engaging portion of the ejector means comprising an arm at the rear of said cavity, said arm having a curvature corresponding to the curvature of the disc and a groove extending along the arm and facing towards said slot, the groove in said arm receiving and supporting the peripheral edge portion of the disc over a substantial are at the rear of the disc to prevent axial displacement of the disc; and means defining opposed tracks formed within the box along opposite sides of the cavity to receive and guide opposed edge portions of the disc along a substantial portion of the cavity and to prevent axial displacement of the disc within the cavity, said groove and said tracks preventing contact between the faces of the disc and the upper and lower walls of the cavity.

2. A container according to claim 1, wherein the ejector means is mounted for pivotal movement about an axis perpendicular to the upper and lower walls.

3. A container according to claim 2, wherein the groove is tapered in cross-section.

4. A container according to claim 1, comprising means adjacent the slot to wipe a face of the disc as it enters and exits the cavity.

5. A container according to claim 1, wherein each of said tracks has a section of arcuate shape having a curvature corresponding to the curvature of the disc, each said arcuate track section being resilient at a forward end portion closest to said slot whereby ejection and insertion of the disc causes the forward end portions of the arcuate track sections to be resiliently deflected from a curved configuration conforming to the periphery of the disc to an outer configuration which permits passage of the disc, said deflectable forward end portions of the arcuate track sections returning to the disc-conforming figuration after passage of the disc.

6. A container according to claim 5, wherein during insertion of the disc the return movement of the said deflectable forward end portions of the arcuate sections to the disc-conforming configuration acts to push the disc fully into the cavity and to retain the disc within the cavity against accidental discharge.

7. A hand held storage container comprising:

a flat generally rectangular and horizontally extending box defining a disc-containing cavity adapted to receive the disc, said cavity having opposed sides, a rear, a front, and opposed upper and lower walls, said box having a slot formed along one edge which communicates with the front of the cavity and through which the disc can be horizontally inserted into and removed from the box in edgewise fashion;

manually operable disc ejector means mounted to engage an edge portion of the disc to displace the disc at least partially from the cavity through the slot, said disc ejector means including a portion extending into the cavity for engaging the disc and a portion extending externally of the box and adapted for manual actuation by an operator, said disc engaging portion of the ejector means comprising an arm at the rear of said cavity, said arm having a curvature corresponding to the curvature of the disc and a groove extending along the arm and facing towards said slot, the groove in said arm receiving and supporting the peripheral edge portion of the disc at the rear of the disc to prevent axial displacement of the disc; and means defining opposed tracks within the box along opposite sides of the cavity to receive and guide opposed edge portions of the disc along a substantial portion of the cavity and to prevent axial displacement of the disc within the cavity, said groove and said tracks preventing contact between the faces of the disc and the upper and lower walls of the cavity, wherein each of said tracks has a section of arcuate shape having a curvature corresponding to the curvature of the disc, each said arcuate track section being resilient at a forward end portion closest to said slot whereby ejection and insertion of the disc causes the forward end portions of the arcuate track sections to be resiliently deflected from a curved configuration conforming to the periphery of the disc to an outer configuration which permits passage of the disc, said deflectable forward end portions of the arcuate track sections returning to the disc-conforming figuration after passage of the disc.

8. A container according to claim 7, wherein each of said arcuate track sections includes a groove extending along the track section to receive and support the disc over a substantial arc.

9. A container according to claim 7, wherein during insertion of the disc the return movement of the said deflectable forward end portions of the arcuate sections to the disc-conforming configuration acts to push the disc fully into the cavity and to retain the disc within the cavity against accidental discharge.

* * * * *